United States Patent
McQuillan

(10) Patent No.: US 9,468,336 B2
(45) Date of Patent: Oct. 18, 2016

(54) COMBINATION BARBECUE

(71) Applicant: Kevin John McQuillan, Tully (AU)

(72) Inventor: Kevin John McQuillan, Tully (AU)

(*) Notice: Subject to any disclaimer, the term of this patent is extended or adjusted under 35 U.S.C. 154(b) by 403 days.

(21) Appl. No.: 14/046,679

(22) Filed: Oct. 4, 2013

(65) Prior Publication Data

US 2015/0034065 A1 Feb. 5, 2015

(30) Foreign Application Priority Data

Aug. 1, 2013 (AU) .................. 2013902867

(51) Int. Cl.
| F24B 3/00 | (2006.01) |
| A47J 37/07 | (2006.01) |
| A47J 37/04 | (2006.01) |
| A47J 36/00 | (2006.01) |

(52) U.S. Cl.
CPC .......... *A47J 37/0713* (2013.01); *A47J 37/0786* (2013.01); *A47J 36/00* (2013.01); *A47J 37/04* (2013.01)

(58) Field of Classification Search
CPC .. A47J 37/07; A47J 37/0786; A47J 37/0713; A47J 37/04; F24B 3/00
USPC ...... 126/25 R, 39 K, 41 R, 265, 4, 5; 99/447, 99/450
See application file for complete search history.

(56) References Cited

U.S. PATENT DOCUMENTS

| 2,631,216 A | 3/1953 | Ames |
| 3,246,644 A | 4/1966 | Peterson |
| 3,786,741 A * | 1/1974 | Plumley ............... A47J 37/101 99/447 |
| 4,840,128 A * | 6/1989 | McFarlane ........... A47J 37/0781 108/25 |
| 5,413,087 A * | 5/1995 | Jean ........................ F24C 3/14 126/38 |
| 5,638,808 A * | 6/1997 | Home .................. A47J 37/0713 126/25 R |
| 5,797,386 A * | 8/1998 | Orr ..................... A47J 37/0763 126/25 A |
| 6,155,228 A * | 12/2000 | Breitenberger ....... F02F 1/4214 123/308 |
| 6,257,227 B1 * | 7/2001 | Harbin ................ A47J 37/0731 126/25 R |
| 8,695,583 B2 * | 4/2014 | Cross ................. A47J 37/0786 126/211 |
| 2003/0145740 A1 * | 8/2003 | Stark ................... A47J 37/0786 99/447 |
| 2008/0041359 A1 * | 2/2008 | Kim .................... A47J 37/0718 126/25 R |
| 2009/0165772 A1 * | 7/2009 | Hunt ..................... A47J 36/2477 126/25 R |
| 2011/0073098 A1 * | 3/2011 | Chang ................. A47J 37/0704 126/25 B |
| 2014/0165993 A1 * | 6/2014 | Ahmed ............... A47J 37/0704 126/25 R |

FOREIGN PATENT DOCUMENTS

WO    WO0139641 A    6/2001

* cited by examiner

*Primary Examiner* — Gregory Huson
*Assistant Examiner* — Nikhil Mashruwala
(74) *Attorney, Agent, or Firm* — Fish & Richardson P.C.

(57) ABSTRACT

A combination barbecue including a divergent stepped lower portion, at least one heating device removably locatable within the divergent stepped lower portion and a kettle portion locatable above the lower portion to form the combination barbecue.

14 Claims, 19 Drawing Sheets

COMBINATION BARBECUE

CROSS REFERENCE TO RELATED APPLICATIONS

This application claims the benefit of the priority of Australian Patent Application No. 2013902867, filed Aug. 1, 2013 and entitled "A COMBINATION BARBECUE".

TECHNICAL FIELD

The present invention relates to cooking and heating devices and in particular to a combination barbecue.

BACKGROUND ART

Barbecues are commercially available and relatively well-known. Barbecues are available in a wide variety of configurations but are typically limited to one cooking style. There are limitations in the manner in which the user can use a barbecue which are generally related to the type of heating that is provided, namely gas, combustion beads or firewood.

There are also limitations on conventional barbecues that limit them to cooking or heating food rather than treating food in a particular way or other purposes such as for heating water that can be used for a shower.

It will be clearly understood that, if a prior art publication is referred to herein, this reference does not constitute an admission that the publication forms part of the common general knowledge in the art in Australia or in any other country.

SUMMARY OF INVENTION

The present invention is directed to a combination barbecue, which may at least partially overcome at least one of the abovementioned disadvantages or provide the consumer with a useful or commercial choice.

With the foregoing in view, the present invention in one form, resides broadly in a combination barbecue including a divergent stepped lower portion, at least one heating device removably locatable within the divergent stepped lower portion and a kettle portion locatable above the lower portion to form the combination barbecue.

The combination barbecue of the present invention will preferably include additional components which can be used together with the lower portion, kettle portion and at least one heating device as required, to achieve different purposes. The additional components will normally include a combination drip tray/lid, legs or a stand to support the barbecue above a surface, a grate/grill/plate or combination of these, support devices to support the grate/grill/plate or other devices such as a frying pan or a wok or a kettle, as examples, and a heat exchange coil.

The combination barbecue of the present invention is typically for cooking as well as use as a heating device as be explained further below. The combination barbecue is preferably configurable into different configurations and with one or more different components in order to perform different functions and allow cooking in different ways. The combination barbecue of the present invention will also preferably allow the heating of water more or less directly so that the heated water can be used as a part of an outdoor or relocatable shower for example. Further, the combination barbecue of the present invention can be used to treat food rather than "cook" food. For example, one food treatment method that can be applied using the combination barbecue of the present invention is smoking or drying food rather than "cooking" the food.

The combination barbecue of the present invention includes a divergent stepped lower portion. Typically the lower portion will have an open bottom and an open top. Both the open bottom and open top are in substantially planar planes which will generally be parallel to one another.

The lower portion is preferably adapted to have the at least one heating device removably located relative thereto in order to provide heat within the lower portion and the barbecue. The at least one heating device is normally located within the lower portion, at least partially.

The lower portion is preferably substantially circular when viewed in plan. According to the preferred embodiment, a single step is provided over the height of the lower portion. The step will preferably divide the lower portion into a lower divergent section and an upper divergent section.

The lower divergent section preferably diverges radially upwardly. A first upwardly extending and outwardly diverging wall is provided defining the lower divergent section with a laterally (outwardly) radiating step wall at an upper end thereof. Typically, the radiating step wall is substantially horizontal but it may be angled upwardly away from a central axis of the lower divergent section. The radiating step wall may have a shape which is other than circular, but preferably, the radiating step wall is substantially annular.

A second upwardly extending and outwardly diverging wall preferably extends from an outer edge of the radiating step wall. The second wall preferably also radiates outwardly from a central axis of the lower portion but typically, at a steeper angle than the lower divergent section.

There will preferably be at least one upper land portion located at or towards an upper end of the lower portion. Preferably, a first land portion will extend radially outwardly from an upper edge of the second upwardly extending and outwardly diverging wall. This first land portion is typically annular in configuration.

Preferably, an upwardly extending wall extends from an outer edge of the first land portion.

A second land portion terminating at an outer free end or circumferential free edge will normally be provided extending from the upwardly extending wall.

This preferred configuration provides a pair of spaced apart land portions at an upper end of the lower portion. These land portions are particularly useful for resting portions of other components on in order to locate them relative to the lower portion.

According to a preferred embodiment, at least two and normally more than two openings are provided through the wall of the lower divergent section in order to mount the at least one heating device relative thereto. Preferably, any openings that are provided for this purpose are provided towards a lower edge of the lower portion and are normally spaced about the lower portion.

One or more pins or other engaging devices will typically extend through the openings in the wall of the lower portion in order to engage with supports on the at least one heating device. Cotter pins, spring pins or similar devices may be used through or about the pins or other engaging devices inside the lower portion in order to prevent or minimise accidental dislodgement of the at least one heating device from the lower portion.

Although the above-described mounting assembly is preferred, any assembly mechanism or method to removably locate the at least one heating device relative to the lower portion can be used.

A portion of the wall of the lower portion adjacent to and in communication with the open bottom of the lower portion is preferably removed or absent to form a scallop opening in the sidewall. This will preferably allow the at least one heating device to be inserted into position within the lower opening and have a portion of the device extending laterally through the scallop opening. This will allow the at least one heating device to close the bottom opening of the lower portion.

The combination barbecue of the present invention also includes at least one heating device removably located within the divergent stepped lower portion. Any type or number of heating devices can be provided. Preferably, a primary heating device is located within the lower portion for the majority of configurations. A gas burner is particularly preferred for portability, ease of use, adjustability of heating and speed of heating.

The preferred gas burner will be of a type having a substantially circular or annular body with a pattern of outlets therein and an elongate supply stem in order to supply gas to the outlets extending normally from one side of the circular or annular body. This type of gas burner is relatively widely conventionally available. Preferably, the supply stem is inserted into the scallop opening in the lower portion with the circular body located within the lower portion through the open bottom of the portion.

The gas burner may have any number and configuration of outlets. For example, the gas burner may have more than one circular ring on the circular body with outlets in one or more circular rings. It is not necessary that the body be circular but it is preferred that the shape of the body matches the open bottom of the lower portion.

More than one primary heating device can be provided if desired. Normally, appropriate connections are provided on the supply stem in order to allow connection of the gas burner to a gas supply, normally in the form of a gas bottle or similar.

The gas burner may be provided with a support plate in order to close the opening at the bottom of the lower portion. According to a preferred embodiment, the support plate will have one or more openings therein. The support plate is typically radially larger than the opening in the lower portion.

The support plate is normally provided with at least two and preferably more than two, upstand portions about, but slightly inside the periphery of the support plate in order that the upstands can be received inside the lower portion. Typically, the upstands are substantially parallel to the lower upwardly extending and outwardly diverging wall. Each upstand portion will typically have at least one opening there through. The pins or other fastening or attachment devices described above will typically be inserted through the lower portion of the barbecue, and extend through an opening in one of the upstands in order to locate the primary heating device within the lower portion.

One or more secondary heating devices may be used in association with the primary heating device. According to a particularly preferred embodiment, the preferred secondary heating device is a heat exchange coil through which water can flow in order to heat the water in the coil. Generally, one or more supports are provided to maintain the coil in its shape and also to support rotations of the coil in a spaced apart configuration for more effective heat transfer. The coil will typically be formed from a single length of tube, which is wound in a helical shape, and an inlet to the coil and an outlet from the coil are provided, with appropriate connections.

The inlet to the coil and the outlet from the coil will normally extend about the bottom of the lower portion through the preferred openings in the support plate. The coil will typically be located directly above the primary heating device and will be adapted to heat the water as the water travels through the coil.

A lower drip tray is preferably provided. The lower drip tray is typically circular, matching the shape of the lower portion and the kettle portion of the barbecue. The lower drip tray is typically radially larger than the upper end of the lower portion and an open end of the kettle portion.

There will typically be an upstanding wall extending about the drip tray which is continuous but spaced inwardly from the edge of the drip tray. Preferably, the upstanding wall is spaced inwardly from the edge of the drip tray sufficiently to allow the drip tray to be converted for use as a lid if necessary, according to some configurations of the combination barbecue. Preferably, a handle or other gripping means may be provided on the opposite side of the drip tray to the upstanding wall, particularly for use when the drip trays used as a lid.

Normally, the combination barbecue of the present invention is mounted on a support frame including a number of legs. The legs may be attached to one another or alternatively, may be attached directly to the lower portion of the combination barbecue. It is preferred that the drip tray is mounted relative to the legs. Preferably, one or more support fingers or extensions extend from each of the legs and the drip tray is adapted to rest on the support fingers or extensions.

According to a preferred embodiment, the combination barbecue of the present invention may also include a support ring. The support ring is typically locatable within the lower portion of the combination barbecue above the primary heater. The support ring is typically circular and is adapted to be directly supported by the lower portion, preferably by the annular step wall.

The combination barbecue of the present invention may further include at least one grate/grill/plate or a combination of these features may be provided in a single member. Typically, any such plate or member will be inserted into the lower portion onto either the support ring, one of the lands at the upper edge of the lower portion or a combination of both.

Preferably, a number of plates will be provided having different configurations including a whole plate, a whole grill plate and a half and half plate in which half of the plate is a grill and the other half is a plate.

An open support frame may be provided. This support frame may be placed above any plate or member inserted into the lower portion of the barbecue and will preferably support a pizza stone or similar thereon. Normally the open support frame will support the pizza stone or similar above the grate or grill or plate in order to allow circulation of heated air beneath the pizza stone or similar.

The combination barbecue of the present invention also includes a kettle portion locatable above the lower portion to form a cooking or heating device. The kettle portion may be used in either an upright or inverted configuration. When used in an upright configuration, that is with a closed top and an open bottom, the kettle portion preferably forms a lid for the lower portion and thereby forms a kettle-style barbecue. In the inverted configuration, that is with a closed bottom and an open top, the kettle portion forms a large pot and the drip tray can be inverted for use as a lid for this large pot.

Typically, the kettle portion will have an open end and a closed end as well as portions of different dimensions over its height. Preferably, a first portion is provided adjacent the open end of the kettle portion which is substantially the same dimension as the upper part of the lower portion. Preferably, the first portion has a peripheral edge which can rest on the second or outer land of the lower portion. The first portion will typically be cylindrical. It will normally be of at least 10 cm in height and more likely between 10 and 40 cm in height although any appropriate height could be used for a given implementation.

The first portion of the kettle portion may be hinged to the lower portion in order to allow a user to pivot the kettle portion upwardly from one side. Any configuration of hinge can be used. It is also preferable that the hinge arrangement allows easy detachment of the kettle portion from the lower portion.

A second portion of the kettle portion is typically spaced concentrically inwardly from the first portion. The second portion is also preferably cylindrical but is typically less than 15 cm in height. The closed end of the kettle portion will normally be in the second portion. The closed end will normally be partially spherical, preferably torispherical. Normally, the second portion is spaced concentrically inwardly from the first portion by an annular wall linking the first and second portions to give the kettle portion a stepped profile.

In the inverted configuration, the second portion of the kettle portion is preferably received partially within the lower portion of the combination barbecue. The annular wall of the kettle portion preferably rests on the annular wall of the lower portion or one of the lands of the lower portion. In this configuration, normally the drip tray is removed from below the lower portion and inverted for use as a lid to close the open end of the kettle portion.

Preferably one or more handles are provided on the kettle portion. A closure mechanism may be provided to allow the kettle portion to be attached to the lower portion in order to hold closed. The kettle portion may have one or more openings in one of the walls of the kettle portion in order to vent the kettle portion.

The combination barbecue of the present invention may further include a container with cover locatable in or on the drip tray for temporary storage. It is preferred that the container with cover will be capable of insertion into the lower portion of the combination barbecue as required. The container will typically be circular having a base wall and a cylindrical sidewall upstanding from the base wall. According to a preferred embodiment, the cover will be at least partially spherical. It is preferred that the container be sized such that the container can be received within the upstanding wall on the drip tray in order to allow movement of the barbecue without dislodging the container.

It is further preferred that one or more support wings may be provided, particularly in relation to one or more of the legs of the combination barbecue upon which devices used with the barbecue can be located during use. In particular, it is preferred that a support wing be provided that attaches and detaches easily and quickly to an upper portion of one of the legs of the combination barbecue. This will allow items such as a plate or tray containing food to be rested on the support wing whilst using the barbecue to cook the food.

The portions the combination barbecue of the present invention are attached to one another in any way using any mechanism. This will typically allow the combination barbecue to be collapsed as much as possible of the portions to be detached from one another to change the configuration of the combination barbecue for different uses.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention or the Claims in any way. The Detailed Description will make reference to a number of drawings as follows:

DESCRIPTION OF EMBODIMENTS

Figure 1:
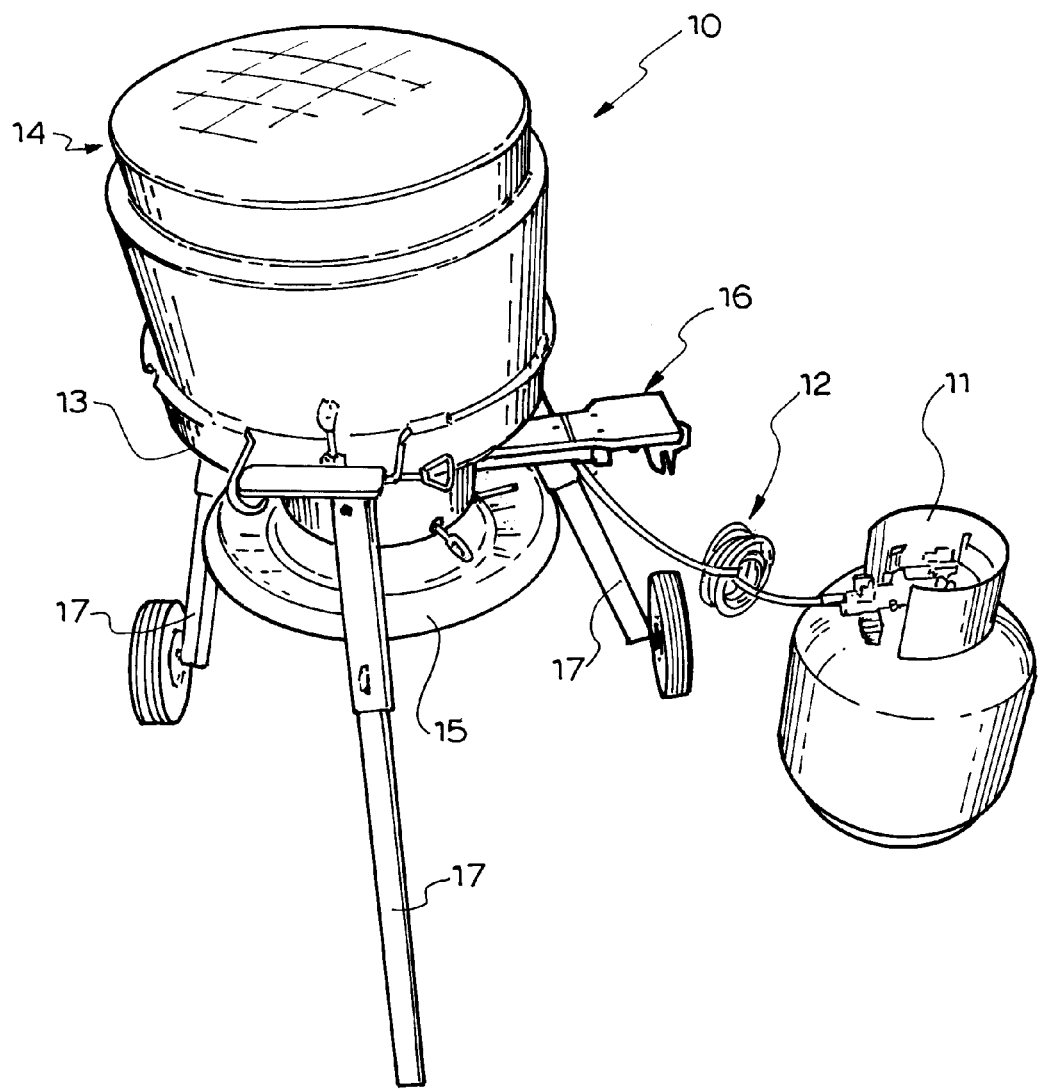
FIG. 1 is an isometric view of a combination barbecue according to a preferred embodiment of the present invention connected to a conventional gas bottle.

According to a particularly preferred embodiment of the present invention, a combination barbecue is provided.

The combination barbecue 10 illustrated in the Figures includes a divergent stepped lower portion 13, a gas burner heating device 16 removably locatable within the divergent stepped lower portion 11 and a kettle portion 14 locatable above the lower portion 13 to form the combination barbecue.

The combination barbecue 10 also includes additional components which can be used together with the lower portion 13, kettle portion 14 and gas burner 16 as required, to achieve different purposes. The additional components will normally include a combination drip tray/lid 15, legs 17 to support the barbecue 10 above a surface, a grill plate 18, flat plate 19 and half and half plate 20, support devices to support the plates or other devices such as a frying pan or a wok or a kettle, as examples, and a heat exchange coil.

Figure 3:
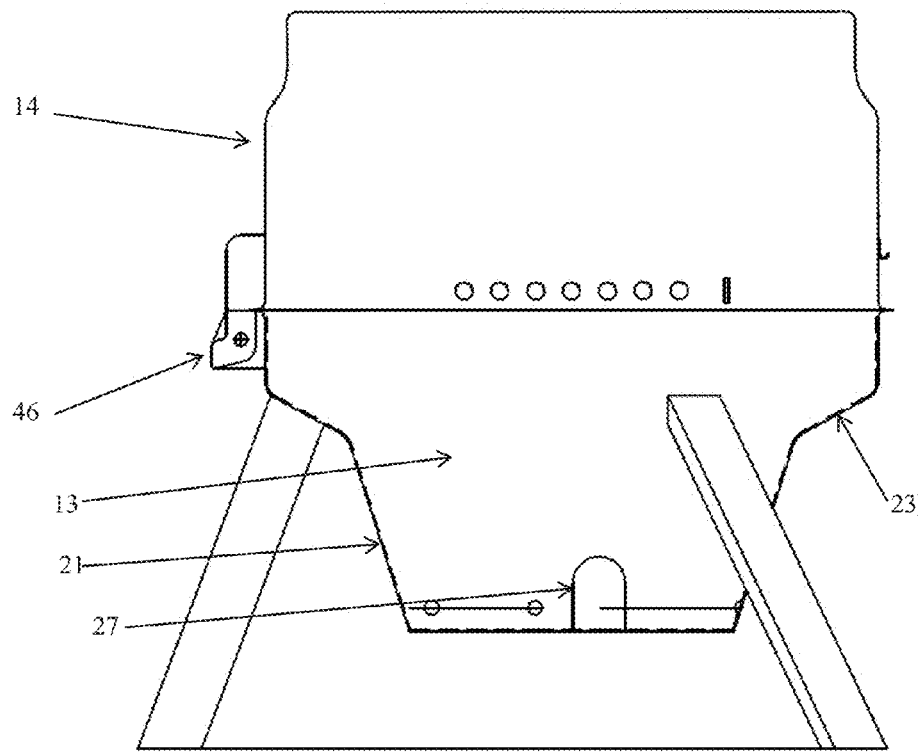
FIG. 3 is a side elevation view of an upper portion of the combination barbecue illustrated in FIG. 1.
Figure 4:
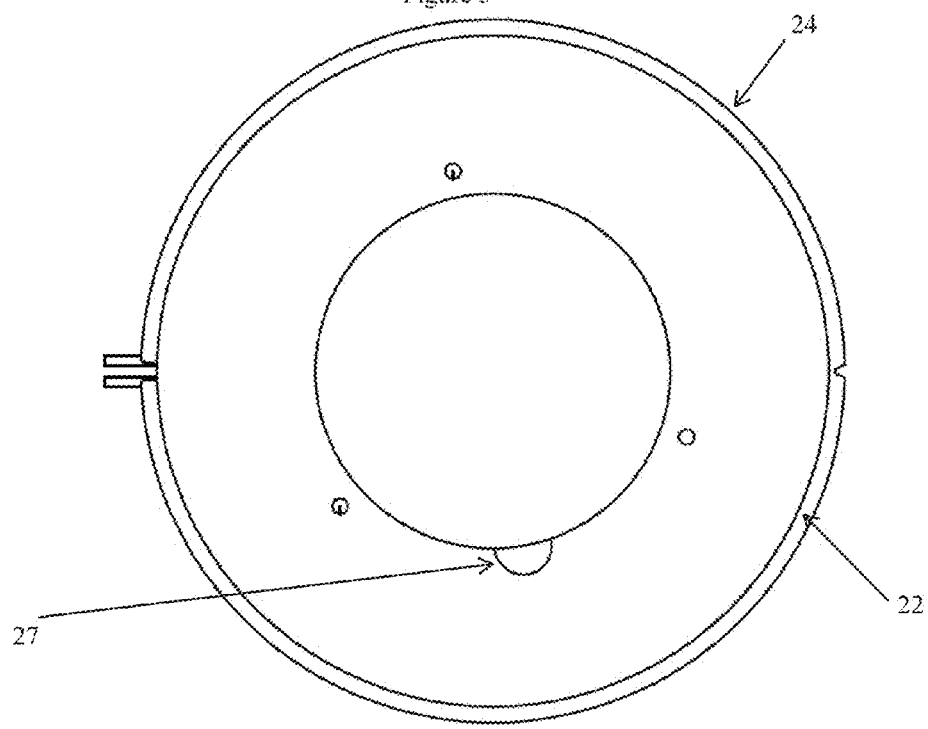
FIG. 4 is a plan view of a lower portion of the combination barbecue illustrated in FIG. 1.
Figure 13:
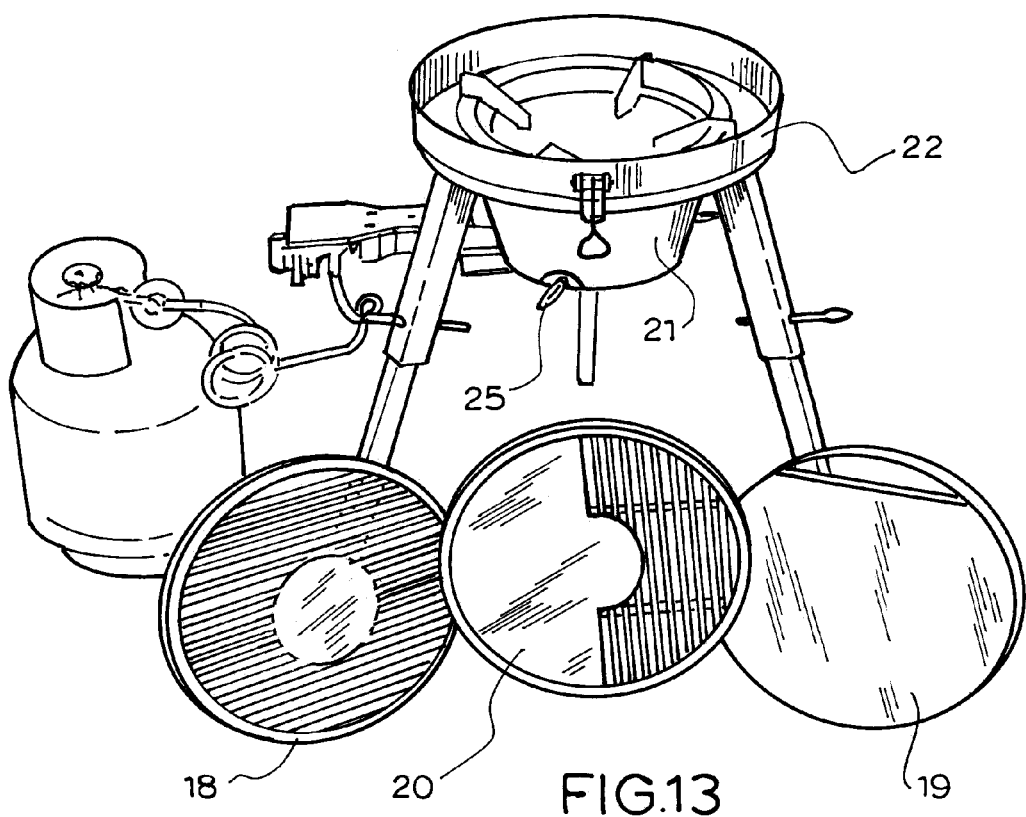
FIG. 13 is an isometric view of the lower portion of the barbecue illustrated in FIG. 1 with examples of plate or grill members which can be used with the configuration illustrated in FIG. 9.

The illustrated combination barbecue 10 includes a divergent stepped lower portion 13 with an open bottom and an open top as illustrated in FIGS. 3 and 13 in particular. Both the open bottom and open top are in substantially planar planes which are parallel to one another.

The lower portion 13 has the gas burner 16 removably located relative thereto in order to provide heat within the lower portion 13 and the barbecue 10. The illustrated lower portion 13 is substantially circular when viewed in plan. According to the preferred embodiment, a single step is provided over the height of the lower portion. As illustrated in FIG. 13 in particular, the step divides the lower portion 13 into a lower divergent section 21 and an upper divergent section 22.

The lower divergent section 21 diverges radially upwardly. A first upwardly extending and outwardly diverging wall is provided defining the lower divergent section 21 with a substantially annular, laterally radiating step wall 23 at an upper end thereof.

A second upwardly extending and outwardly diverging wall extends from an outer edge of the radiating step wall 23. The second wall also radiates outwardly from a central axis of the lower portion 13 but typically, at a steeper angle than the lower divergent section 21.

A land 24 extends radially outwardly from an upper edge of the upper divergent section 22 which is a particularly useful for resting portions of other components on in order to locate them relative to the lower portion 13.

According to the illustrated embodiment, openings are provided through the wall of the lower divergent section 21 in order to mount the gas burner relative thereto. These openings are provided towards a lower edge of the lower portion 13 and are normally spaced about the lower portion 13.

One or more pins 25 extend through the openings in the wall of the lower portion and engage with supports on the gas burner assembly. Cotter pins or spring pins 26 are used through or about the pins 25 inside the lower portion 13 in order to prevent or minimise accidental dislodgement of the at gas burner assembly from the lower portion 13.

A portion of the wall of the lower portion adjacent to and in communication with the open bottom of the lower portion 13 is absent to form a scallop opening 27 in the sidewall. This allows the gas burner 16 to be inserted into position within the lower opening and have a portion of the gas burner 16 extending laterally through the scallop opening 27.

Figure 5:
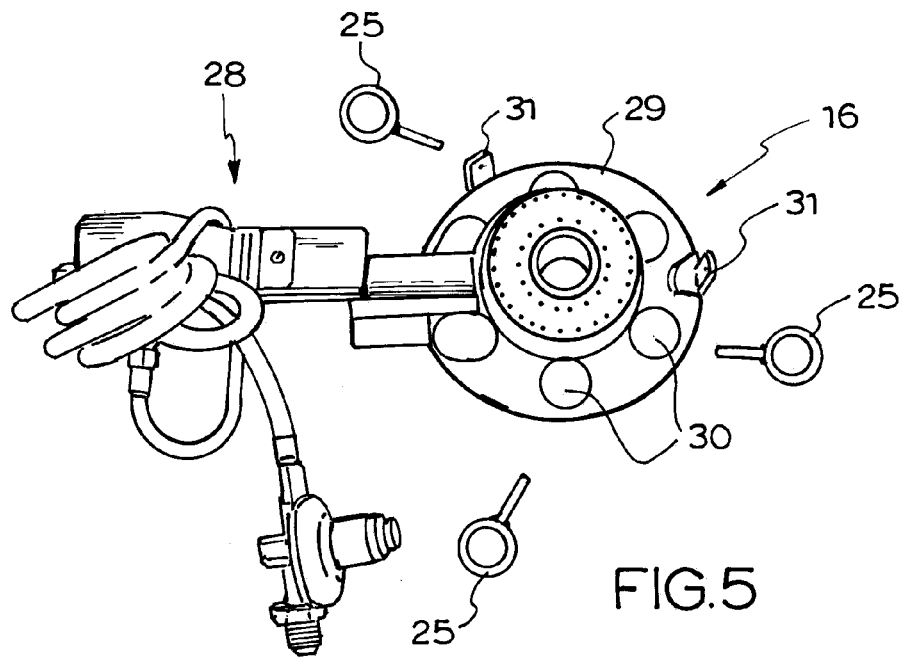
FIG. 5 is a plan view of a heating device according to a preferred embodiment of the present invention removed from the barbecue.
Figure 6:
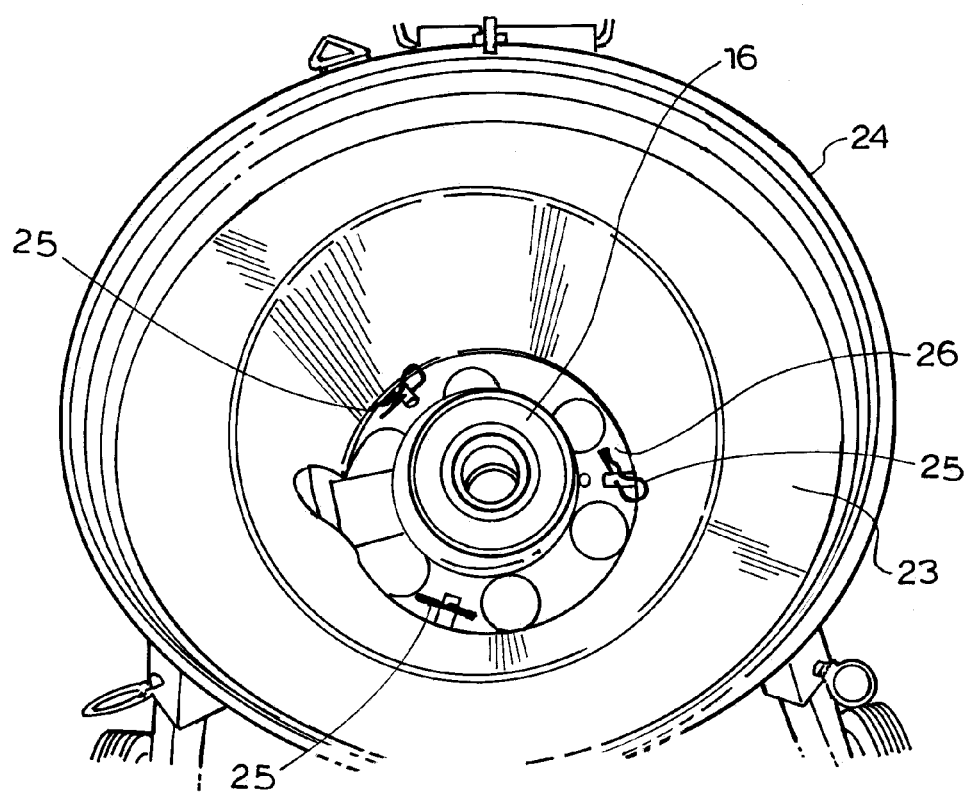
FIG. 6 is a plan isometric view of the lower portion of the combination barbecue illustrated in FIG. 1 with the heating device in use condition.
Figure 7:
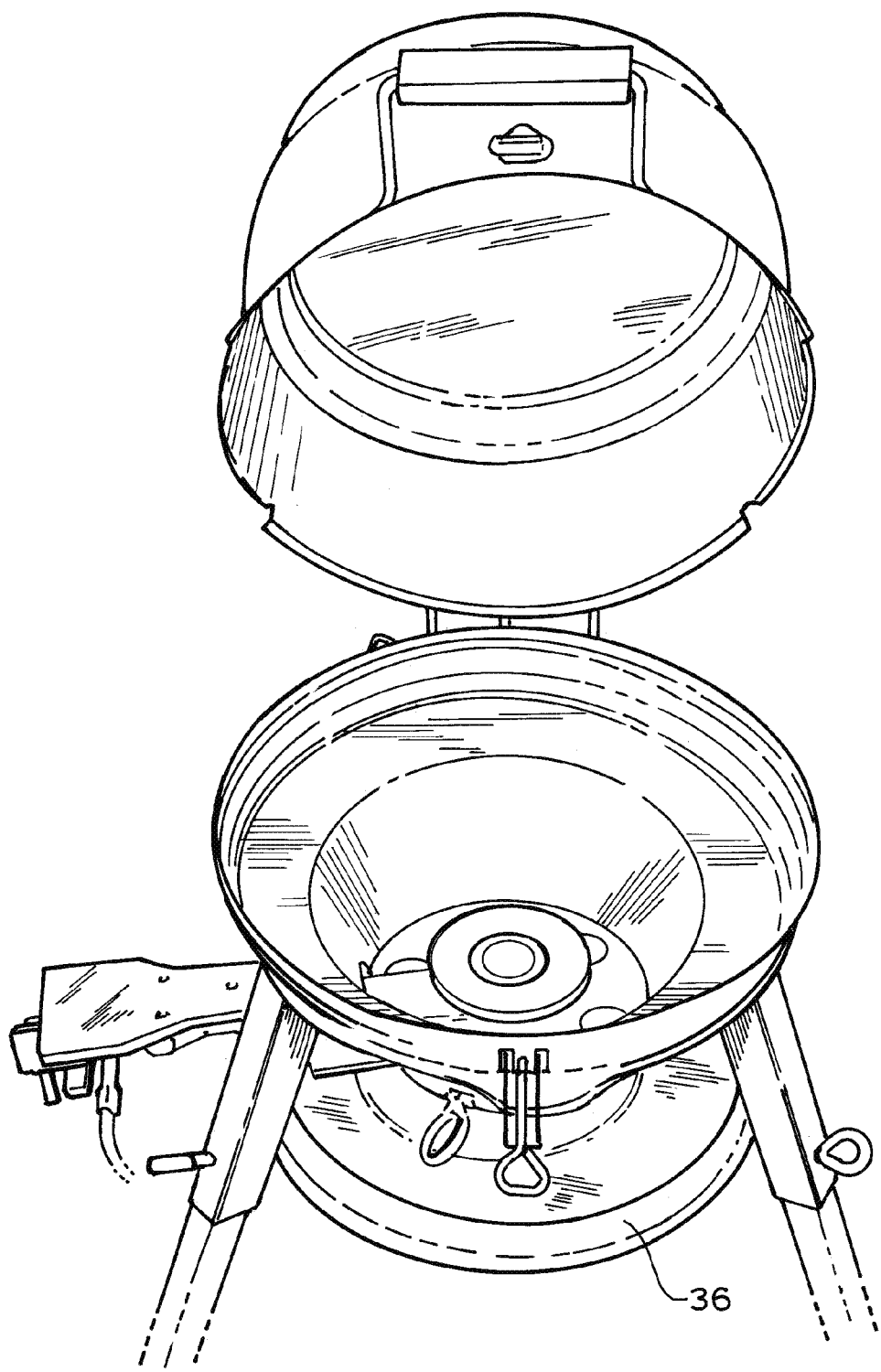
FIG. 7 is an isometric view of the barbecue illustrated in FIG. 1 with the kettle portion raised.
Figure 8:
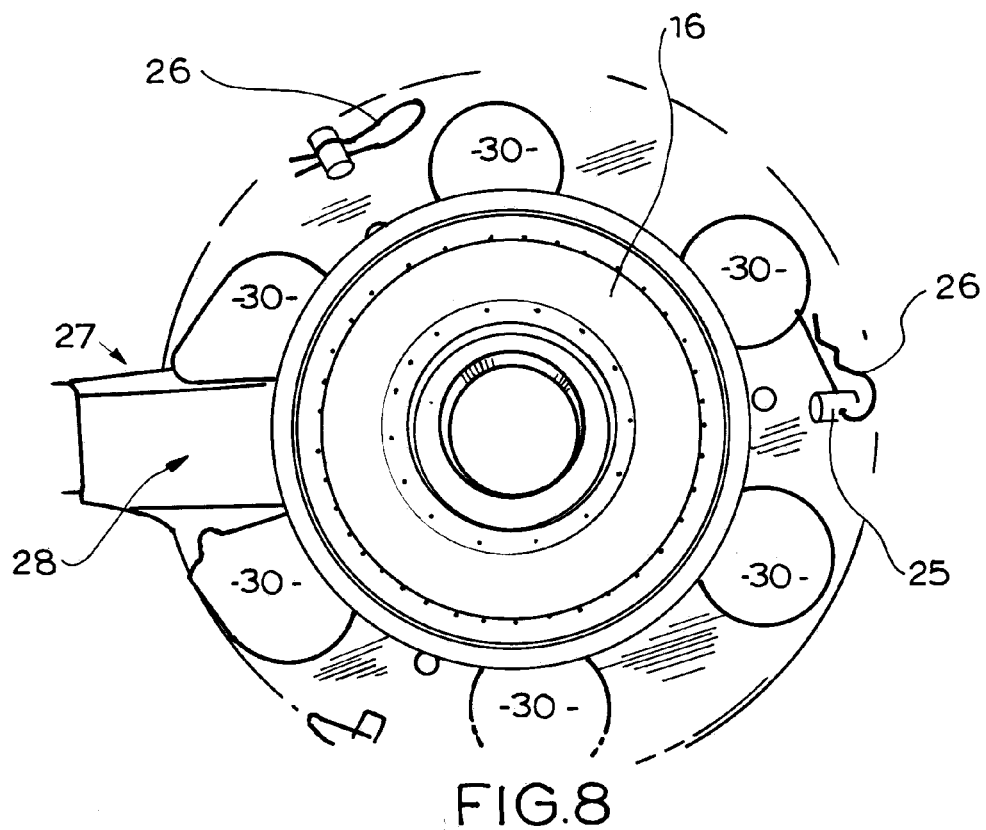
FIG. 8 is a detailed plan view of the heating device located in the lower portion of the barbecue illustrated in FIG. 1.

The gas burner 16 illustrated in FIG. 5 in particular, is of a type having a substantially circular or annular body with a pattern of outlets therein and an elongate supply stem 28 in order to supply gas to the outlets, extending normally from one side of the circular or annular body. This type of gas burner is relatively widely conventionally available. As illustrated in the Figures, the supply stem 28 is inserted into the scallop opening 27 in the lower portion with the circular body of the gas burner 16 located within the lower portion 13 through the open bottom of the portion.

Normally, appropriate connections are provided on the supply stem in order to allow connection of the gas burner 16 to a gas supply, normally in the form of a gas bottle 11 or similar using one or more gas lines 12.

As illustrated in FIG. 5, the gas burner 16 may be provided with a support plate 29 in order to close the opening at the bottom of the lower portion 13. According to the illustrated embodiment, the support plate 29 has openings 30 therein and is radially larger than the opening in the lower portion 13.

Figure 24:
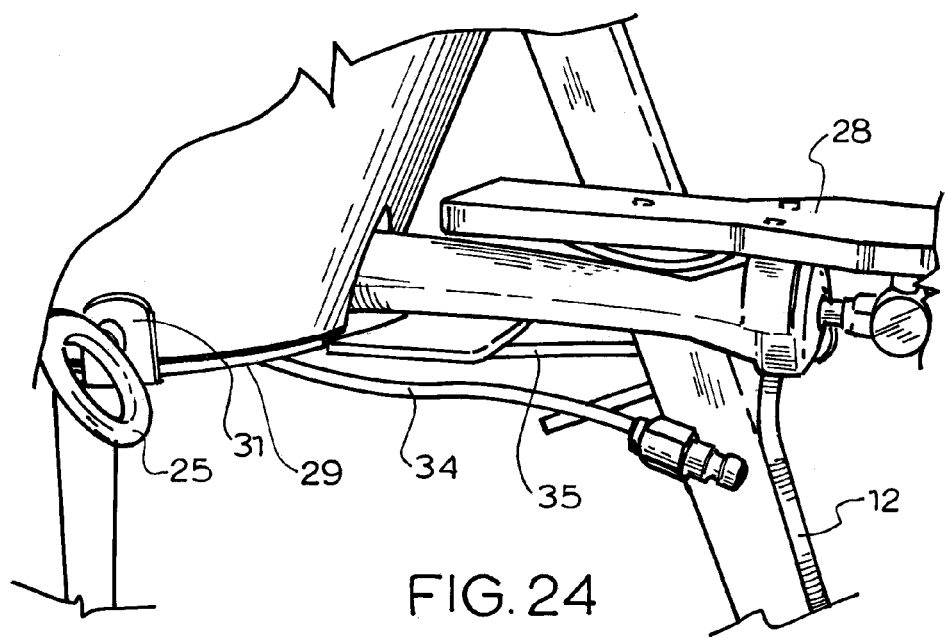
FIG. 24 is a detailed side view of the entry point of the heating device into the lower portion of the barbecue illustrated in FIG. 1 also showing the water coil inlet.
Figure 25:
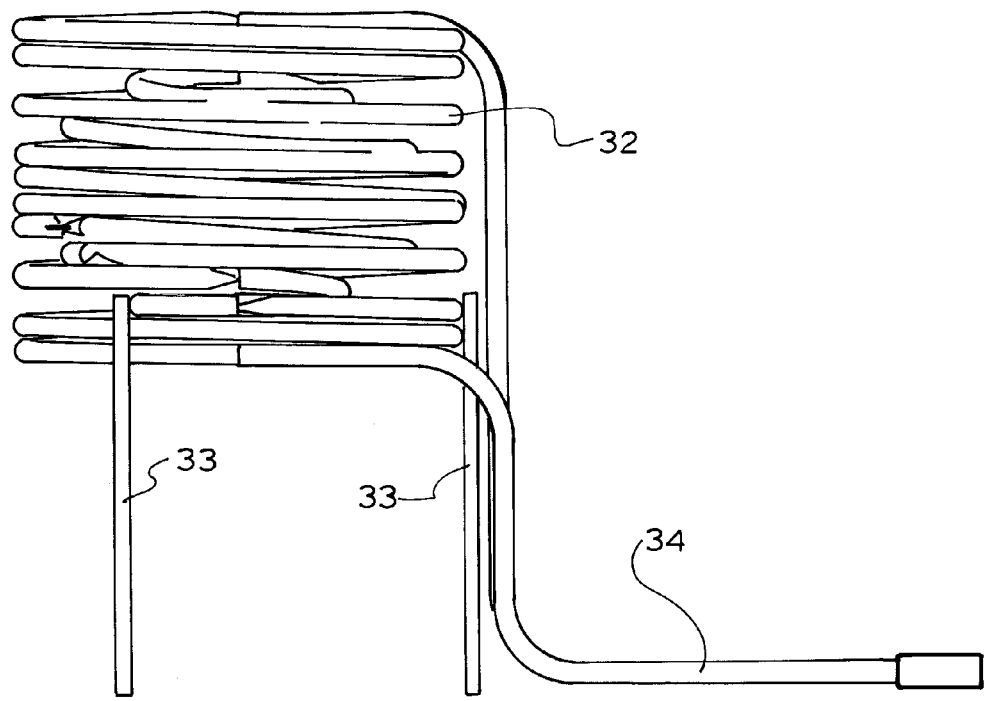
FIG. 25 is a side view of a preferred embodiment of water coil used according to a preferred embodiment of the present invention.
Figure 26:
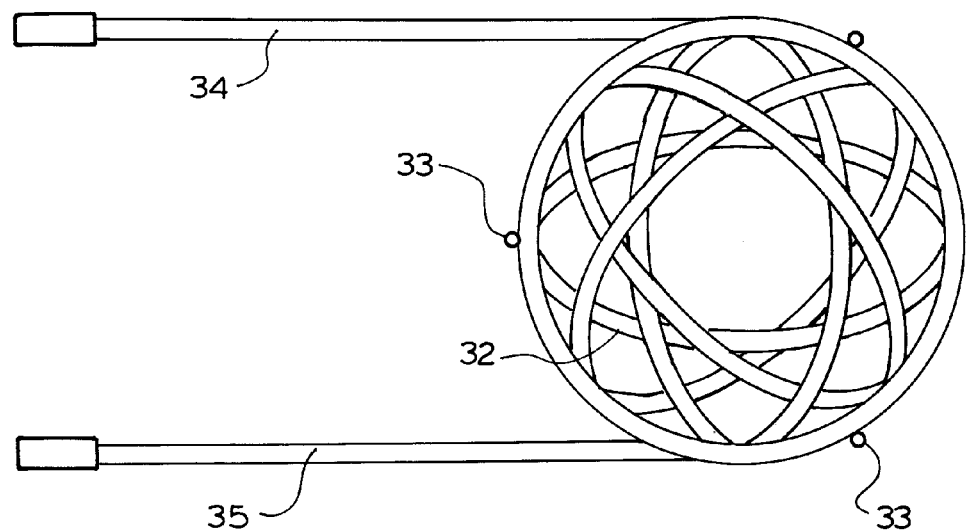
FIG. 26 is a top view of the water coil illustrated in FIG. 25.

The support plate 29 is provided with upstand portions 31 about the periphery of the support plate 29 in order that the upstands 31 can be receive the lower portion 13. The upstands 31 are substantially parallel to the lower upwardly extending and outwardly diverging wall. Each upstand 31 has an opening therethrough. The pins 25 described above are inserted through the an opening in one of the upstands 31 and through the lower portion 13 in order to locate the gas burner 16 within the lower portion 13. This arrangement is illustrated in more detail in FIG. 24.

Figure 27:
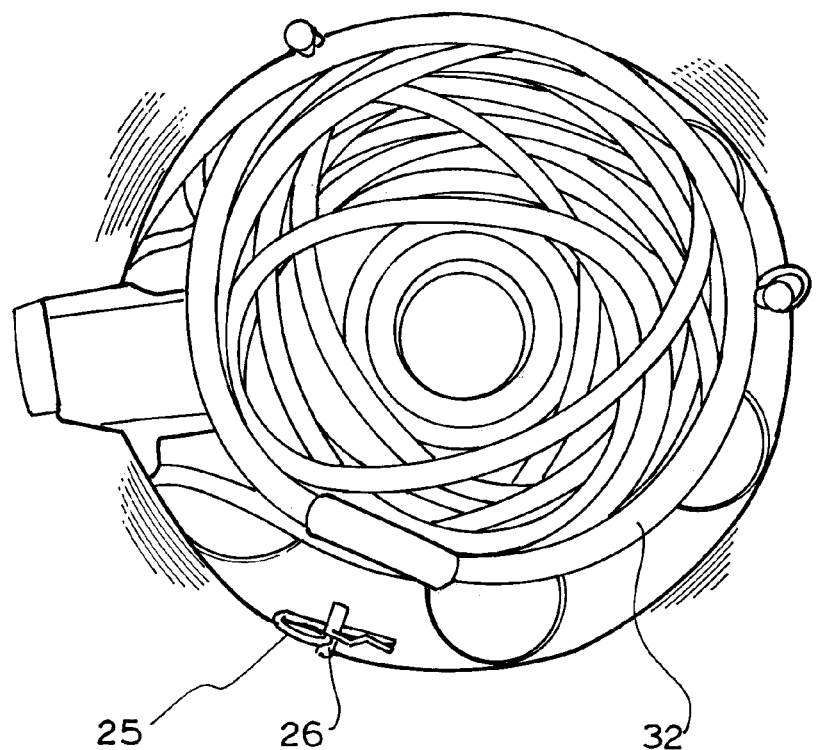
FIG. 27 is a plan view of the configuration illustrated in FIG. 8 with the water coil of the preferred embodiment in use condition.

According to a particularly preferred embodiment illustrated in FIGS. 24 to 27, a secondary heating device in the form of a heat exchange coil 32 through which water can flow in order to heat the water in the coil 32. One or more supports 33 are provided to maintain the coil 32 in its shape and also to support rotations of the coil 32 in a spaced apart configuration for more effective heat transfer. The coil 32 is normally formed from a single length of tube, which is wound in a helical shape, and an inlet to 34 and an outlet 35 from the coil are provided, with appropriate connections. FIG. 27 shows the coil 32 supported on the supports 33 above the gas burner 16 within the lower portion 13.

The inlet 34 to the coil and the outlet 35 from the coil both extend out of the bottom of the lower portion through the openings 30 in the support plate 20. As illustrated in FIG. 27, the coil 32 is located directly above the gas burner 16 and is adapted to heat the water as the water travels through the coil 32.

Figure 10:
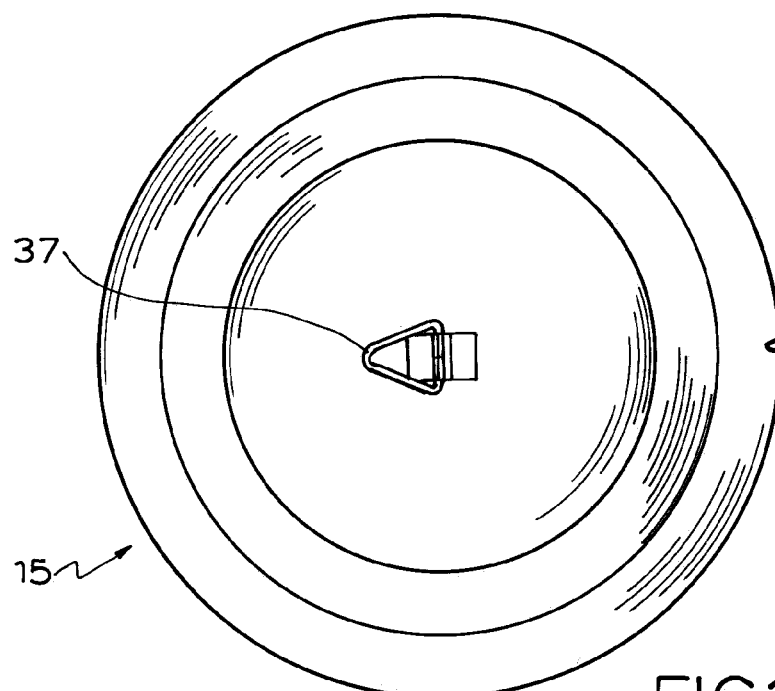
FIG. 10 is a plan view of the reverse side of the drip tray/lid according to a preferred embodiment of the present invention.

A lower drip tray/lid is also provided in the illustrated embodiment. The lower drip tray as illustrated in FIGS. 1 and 10 is circular, matching the shape of the lower portion 13 and the kettle portion 14 of the barbecue. The lower drip tray is radially larger than the upper end of the lower portion and the open end of the kettle portion.

There will typically be an upstanding wall 36 extending about the drip tray 15 which is continuous but spaced inwardly from the edge of the drip tray sufficiently to allow the drip tray to be converted for use as a lid if necessary. A handle 37 is provided on the opposite side of the drip tray to the upstanding wall 36, particularly for use when the drip trays used as a lid.

Figure 2:
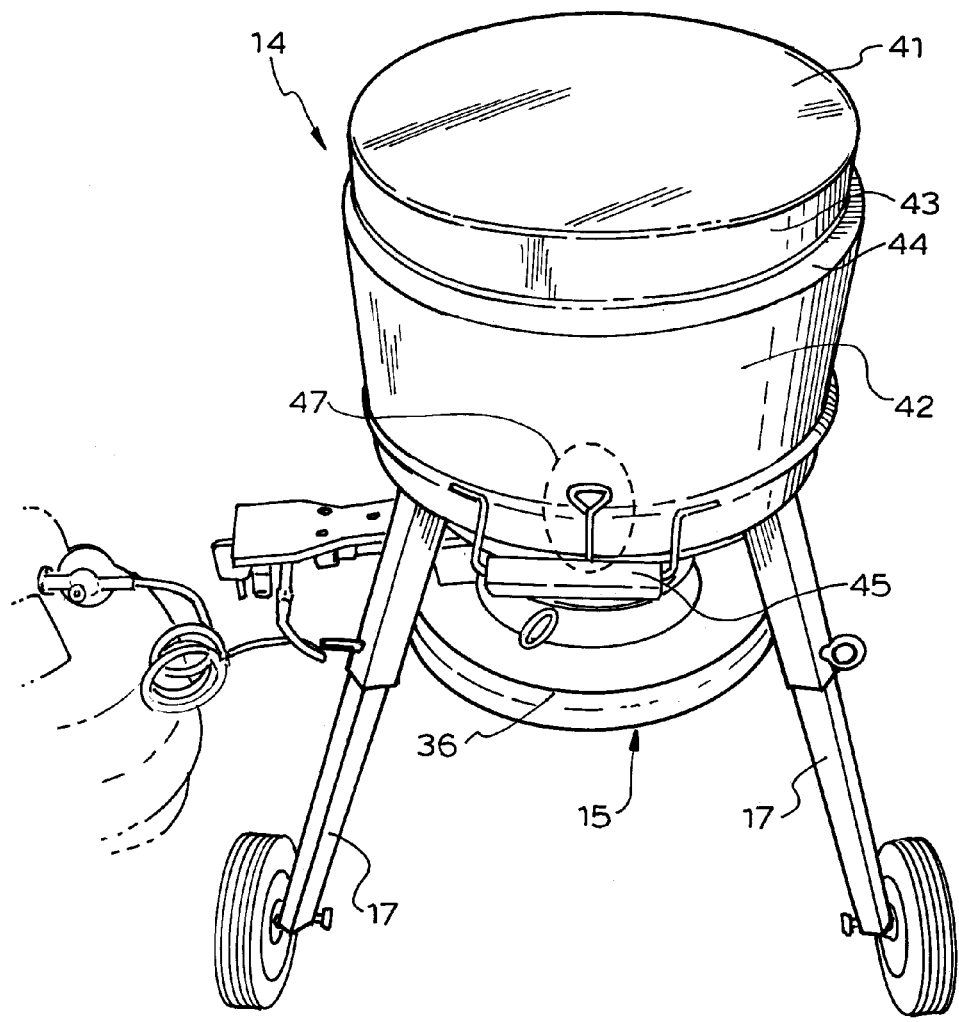
FIG. 2 is an isometric view from the opposite side of the view illustrated in FIG. 1.

Normally, the combination barbecue of the present invention is mounted on a support frame including a number of legs 17. The legs can be attached to one another or alternatively, may be attached directly to the lower portion of the combination barbecue. It is preferred that the drip tray 15 is mounted relative to the legs as illustrated in FIG. 2. Preferably, one or more support fingers or pins 38 (best illustrated in FIGS. 11 and 12) extend from each of the legs 17 and the drip tray 15 is adapted to rest on the support fingers or pins 38.

Figure 21:
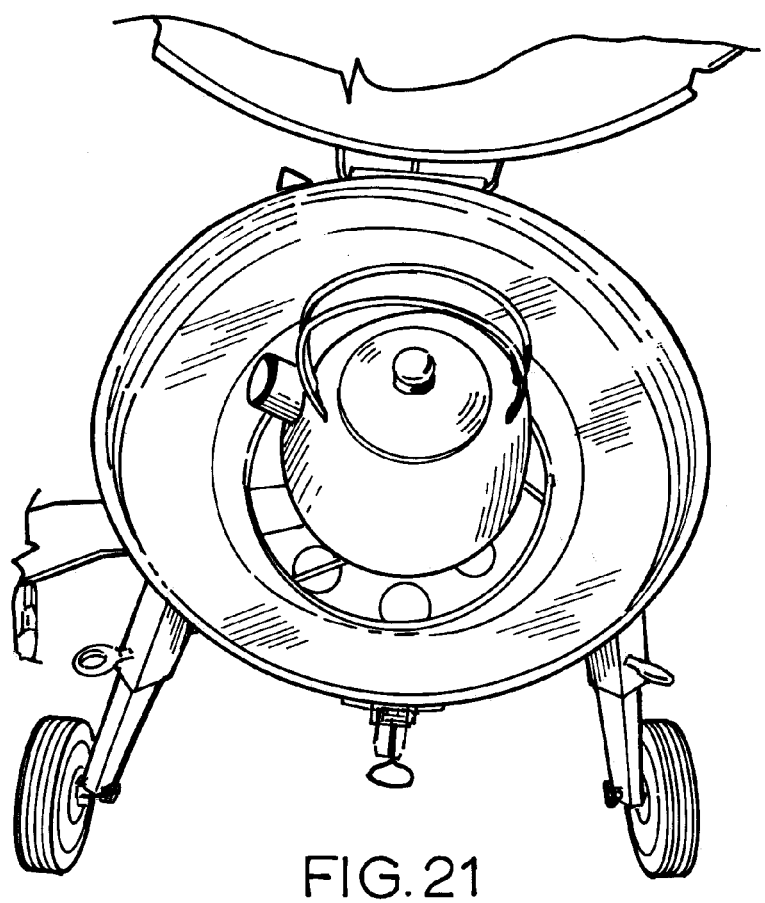
FIG. 21 is an isometric view of the barbecue illustrated in FIG. 1 in the kettle configuration.
Figure 22:
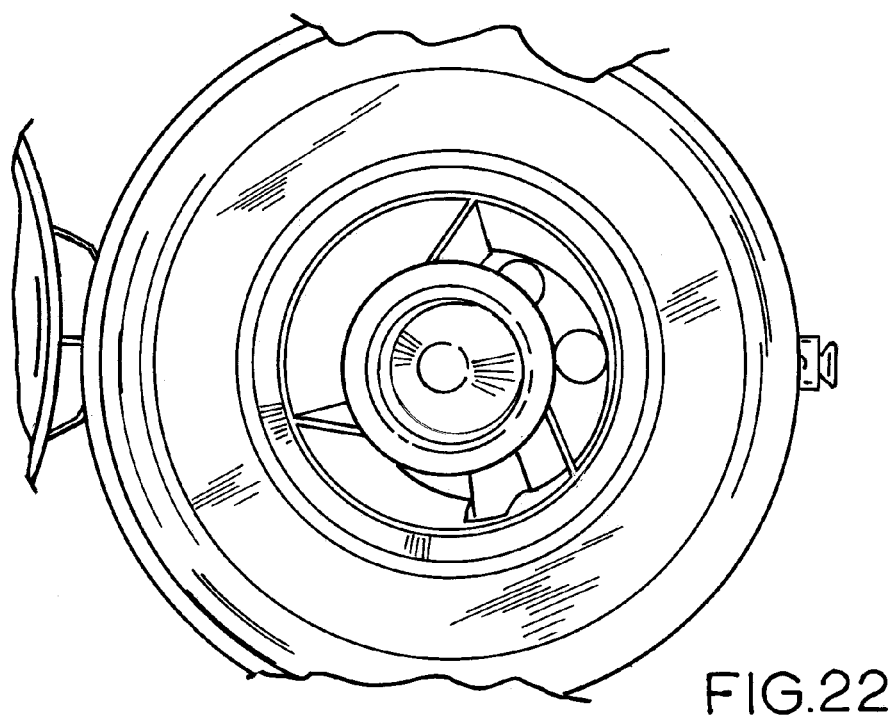
FIG. 22 is a plan view of the lower portion of the barbecue illustrated in FIG. 1 with a kettle or pot support ring in place.

According to a preferred embodiment, the combination barbecue of the present invention may also include a support ring, locatable within the lower portion of the combination barbecue above the gas burner. There are two different configurations of support ring illustrated, the first on FIG. 9 and adapted to support the plates and the other in FIGS. 21 and 22 which is used to support a kettle and a wok. Each support ring is typically circular and is adapted to be directly supported by the lower portion, preferably by the annular step wall 23.

Figure 9:
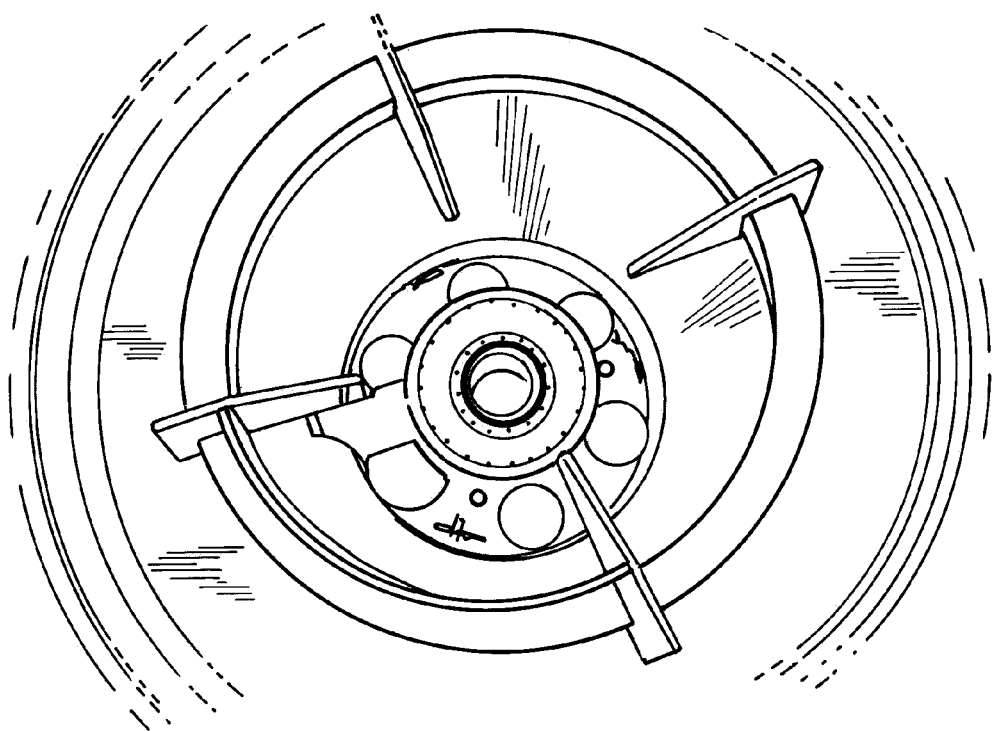
FIG. 9 is a detailed plan view of the lower portion of the barbecue illustrated in FIG. 1 with a support ring located therein.
Figure 14:
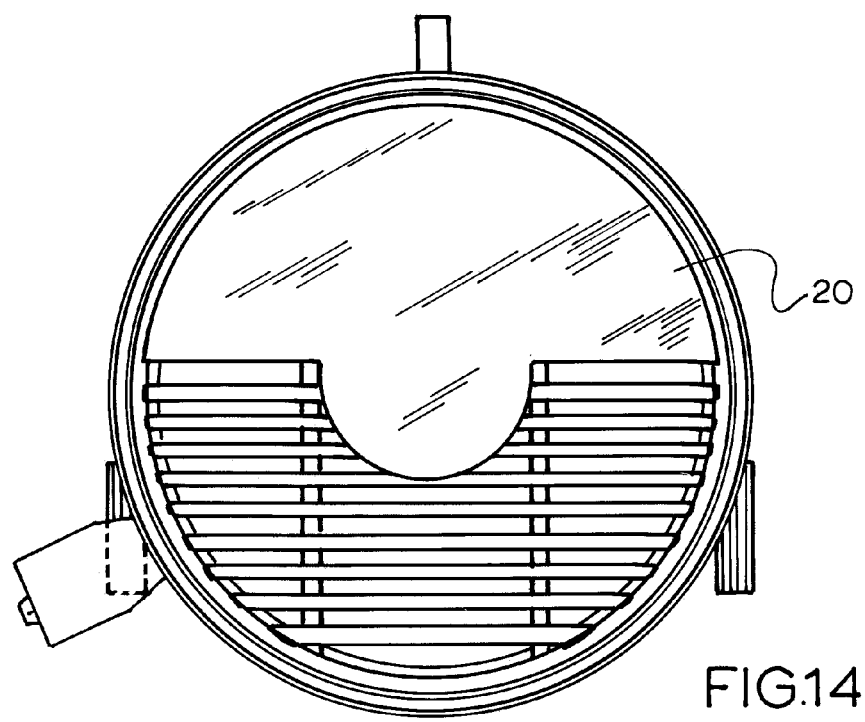
FIG. 14 is a plan view of the barbecue illustrated in FIG. 9 with a half and half plate in position.
Figure 15:
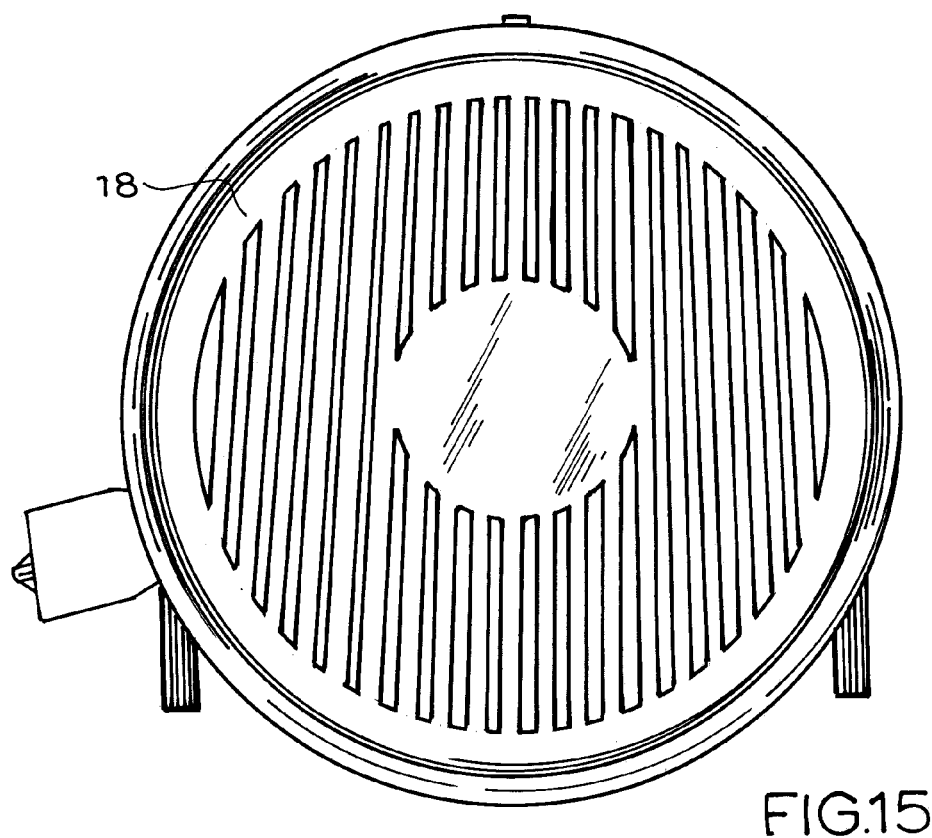
FIG. 15 is a plan view of the barbecue illustrated in FIG. 9 with a grill plate in position.
Figure 16:
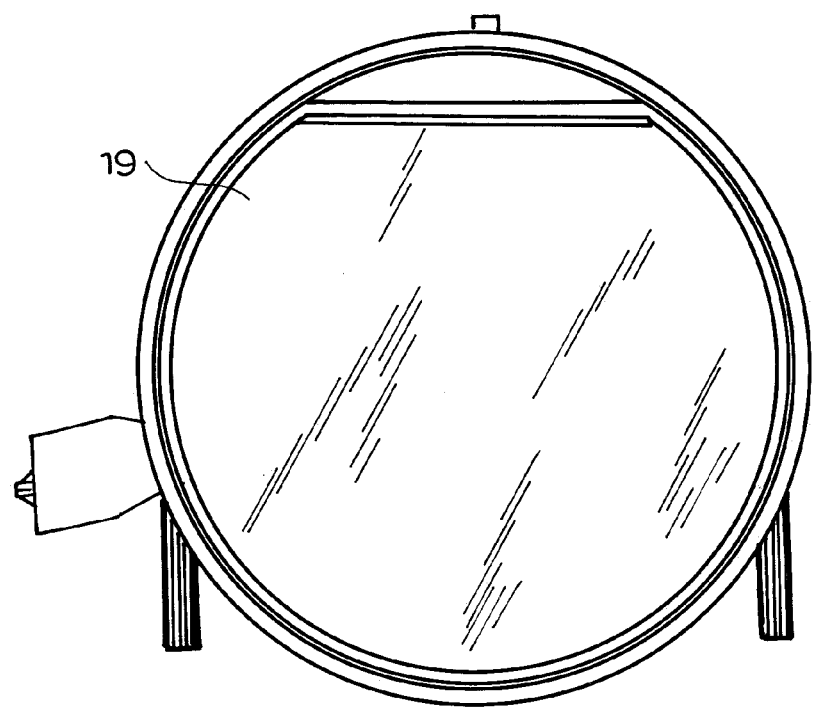
FIG. 16 is a plan view of the barbecue illustrated in FIG. 9 with a full plate in position.

As illustrated in FIGS. 14 to 16, the grill plate 18, flat plate 19 or half and half plate 20 is inserted into the lower portion 13 onto the support ring illustrated in FIG. 9.

Figure 17:
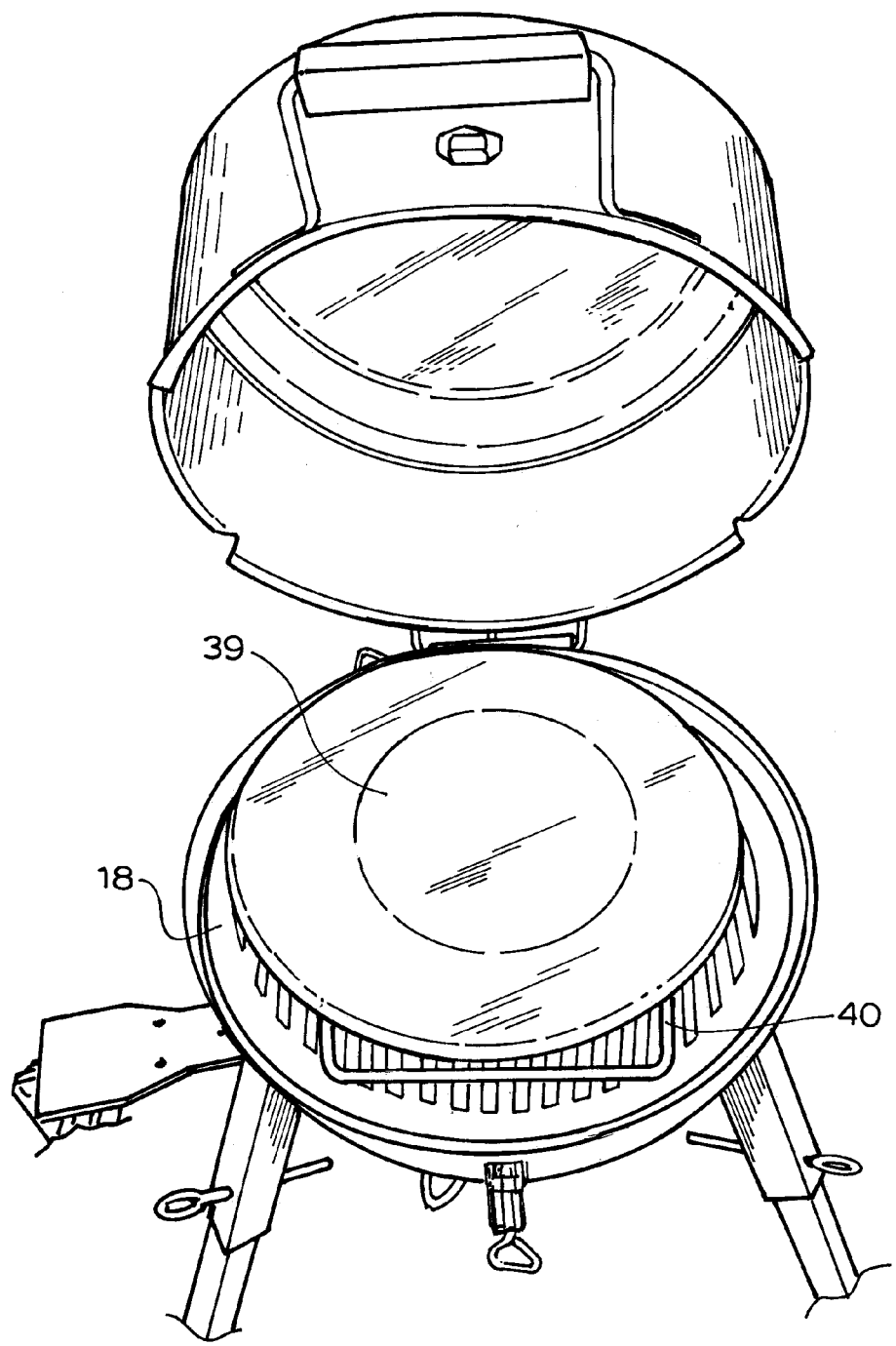
FIG. 17 is an isometric view of the barbecue illustrated in FIG. 1 in the pizza cooking configuration.
Figure 18:
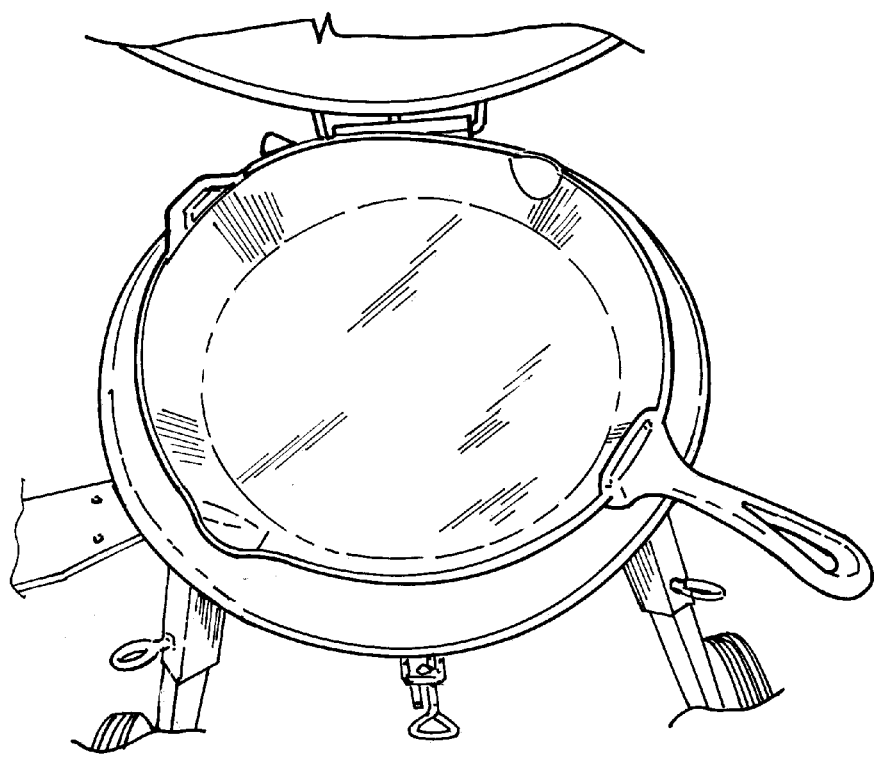
FIG. 18 is an isometric view of the barbecue illustrated in FIG. 1 in the frying pan configuration.
Figure 19:
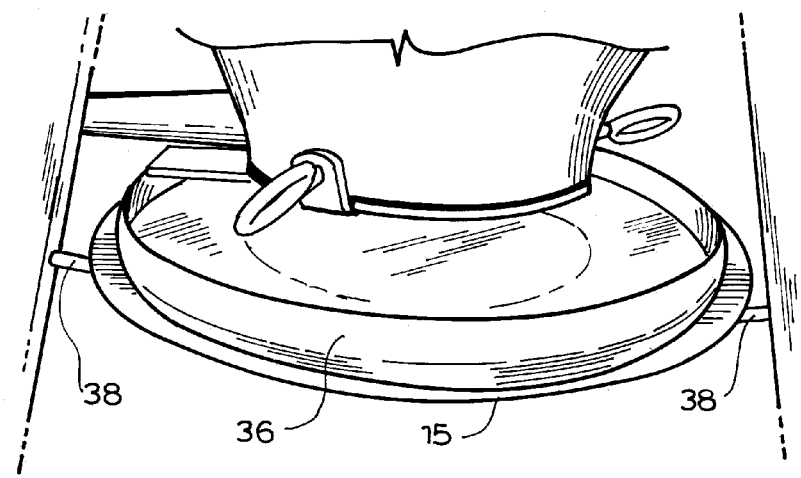
FIG. 19 is a detailed view of the lower periphery of the barbecue illustrated in FIG. 1 showing the drip tray in position.
Figure 20:
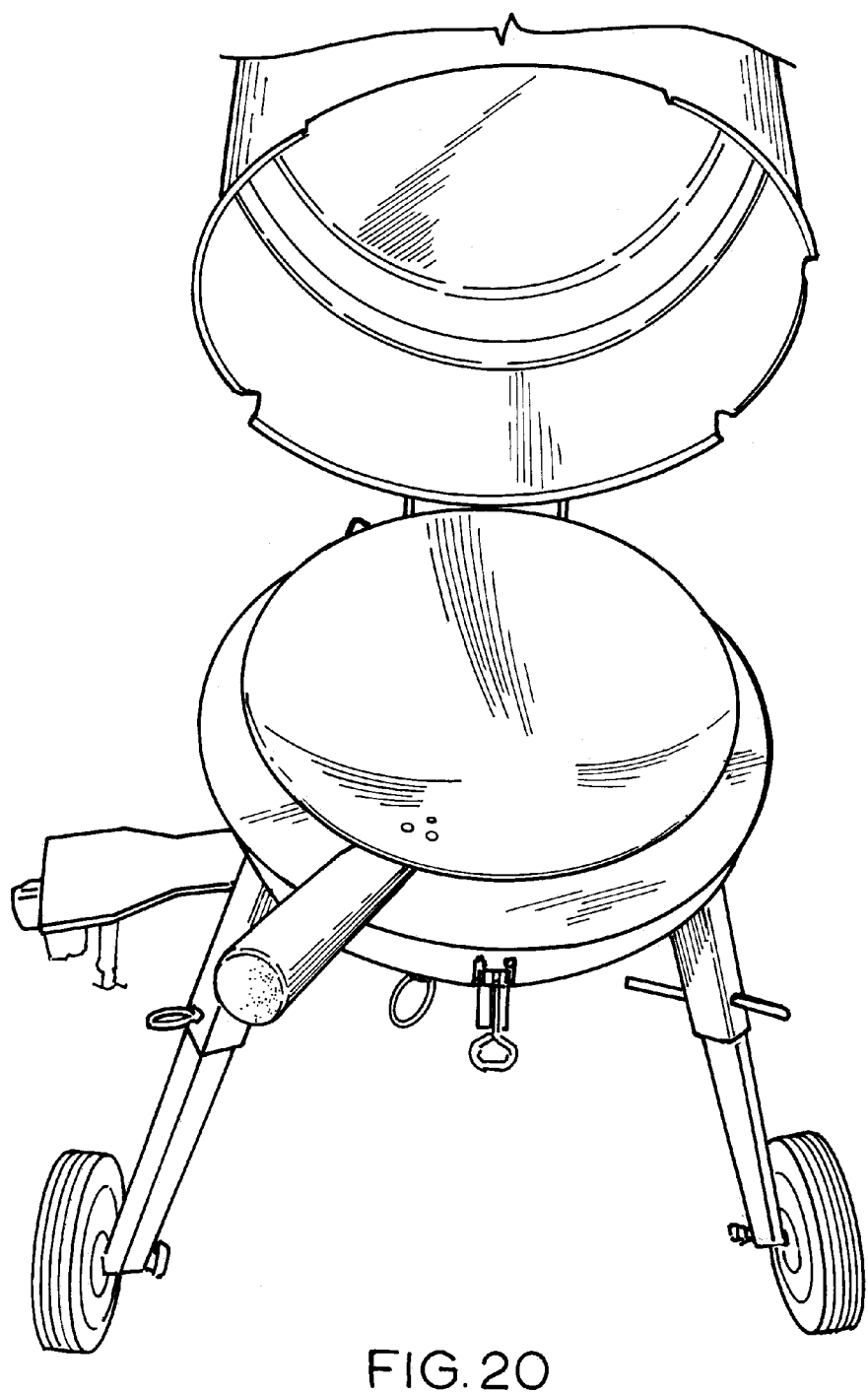
FIG. 20 is an isometric view of the barbecue illustrated in FIG. 1 in the wok burning configuration.

As illustrated in FIG. 17, an open support frame 40 may be provided and placed above a grill plate 18 to support a pizza stone 39 or similar thereon. Normally the open support frame 40 support the pizza stone 39 or similar above the grill plate 18 in order to allow circulation of heated air beneath the pizza stone 39 or similar.

The kettle portion 14 has an open end and a closed bottom wall as well as portions of different dimensions over its height. A cylindrical first portion 42 is provided adjacent the open end of the kettle portion 14 which is substantially the same dimension as the upper part of the lower portion 13. The first portion 42 has a peripheral edge which can rest on the upper land of the lower portion 13 as illustrated in FIGS. 1 to 3. It will normally be of at least 10 cm in height and more likely between 10 and 40 cm in height although any appropriate height could be used for a given implementation.

The first portion 42 of the kettle portion is hinged to the lower portion 13 in order to allow a user to pivot the kettle portion upwardly from one side as illustrated in a number of Figures. Any configuration of hinge can be used. It is also preferable that the hinge 46 allows easy detachment of the kettle portion from the lower portion.

A second portion 43 of the kettle portion is spaced concentrically inwardly from the first portion 42. The second portion 43 is also cylindrical but is typically less than 15 cm in height. The closed bottom wall 41 of the kettle portion is in the second portion 43 and will normally be partially spherical, preferably torispherical. Normally, the second portion is spaced concentrically inwardly from the first portion by an annular wall 44 linking the first and second portions to give the kettle portion a stepped profile.

Figure 11:
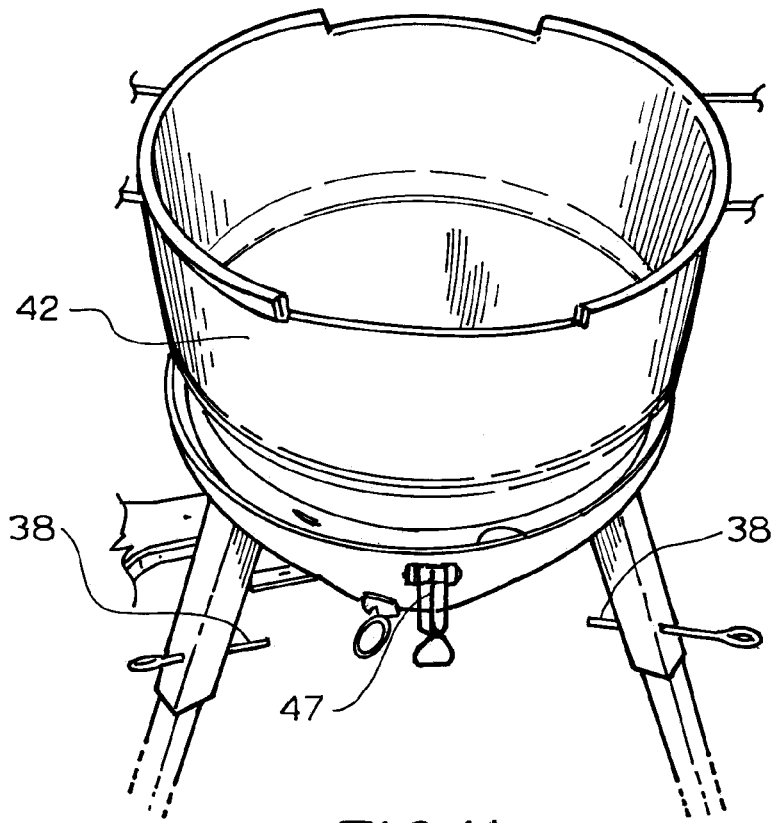
FIG. 11 is an isometric view of the barbecue illustrated in FIG. 1 with the kettle portion in the inverted condition for use as a pot.
Figure 12:
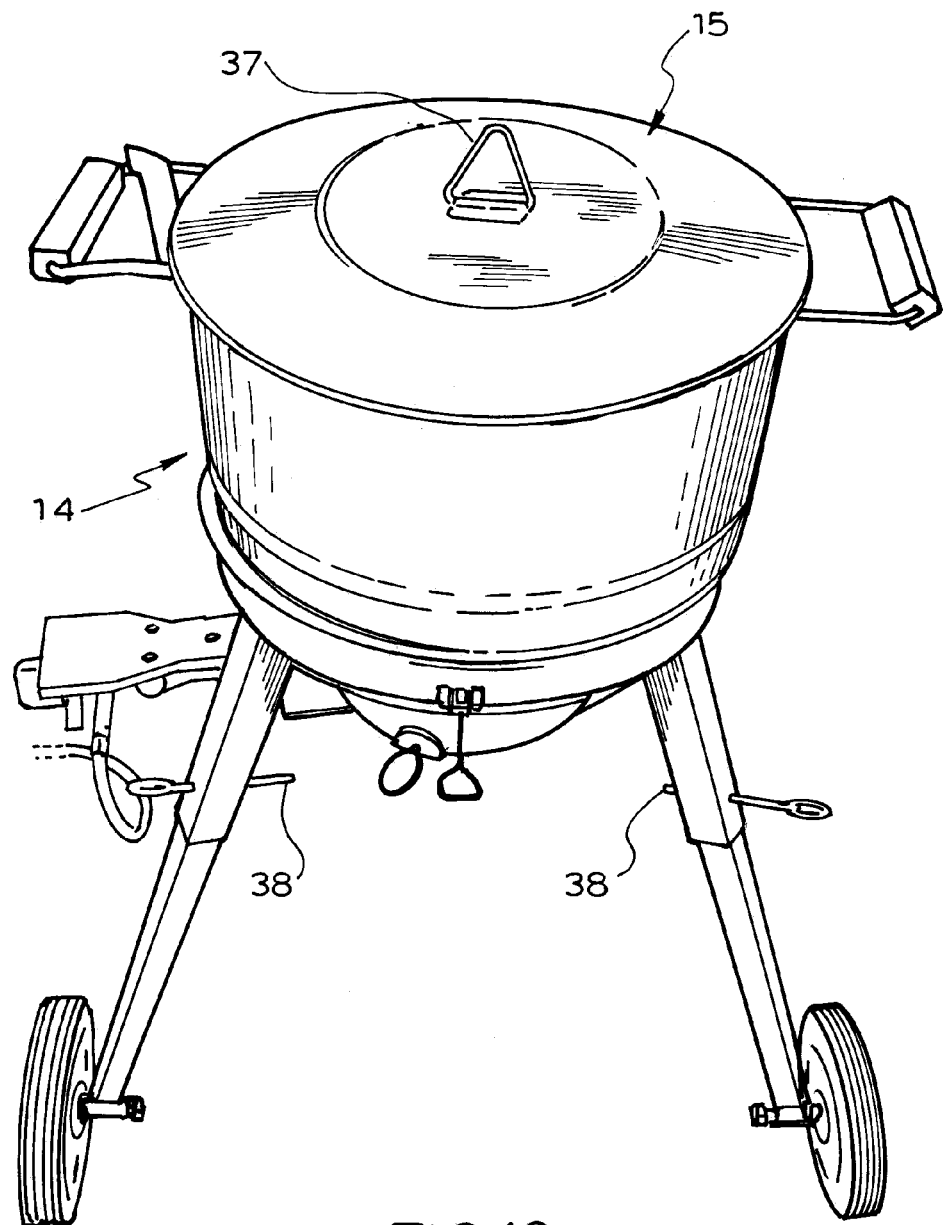
FIG. 12 is an isometric view of the configuration illustrated in FIG. 11 with the lid applied.

The kettle portion can be used in either an upright or inverted configuration. When used in an upright configuration, that is with a closed top and an open bottom as illustrated in FIGS. 1-3 in particular, the kettle portion preferably forms a lid for the lower portion and thereby forms a kettle-style barbecue. In the inverted configuration, that is with a closed bottom and an open top as illustrated in FIGS. 11 and 12, the kettle portion forms a large pot and the drip tray 15 can be inverted for use as a lid for this large pot.

In the inverted configuration, the second portion 43 of the kettle portion is received partially within the lower portion 13 of the combination barbecue. The annular wall of the kettle portion preferably rests on the annular wall of the lower portion or on the upper land of the lower portion. In this configuration, normally the drip tray 15 is removed from below the lower portion and inverted for use as a lid to close the open end of the kettle portion.

Preferably a handle 45 is provided on the kettle portion. A closure mechanism 37 is also provided to allow the kettle portion to be attached to the lower portion in order to hold closed. The kettle portion may have one or more openings in one of the walls of the kettle portion in order to vent the kettle portion.

Figure 23:
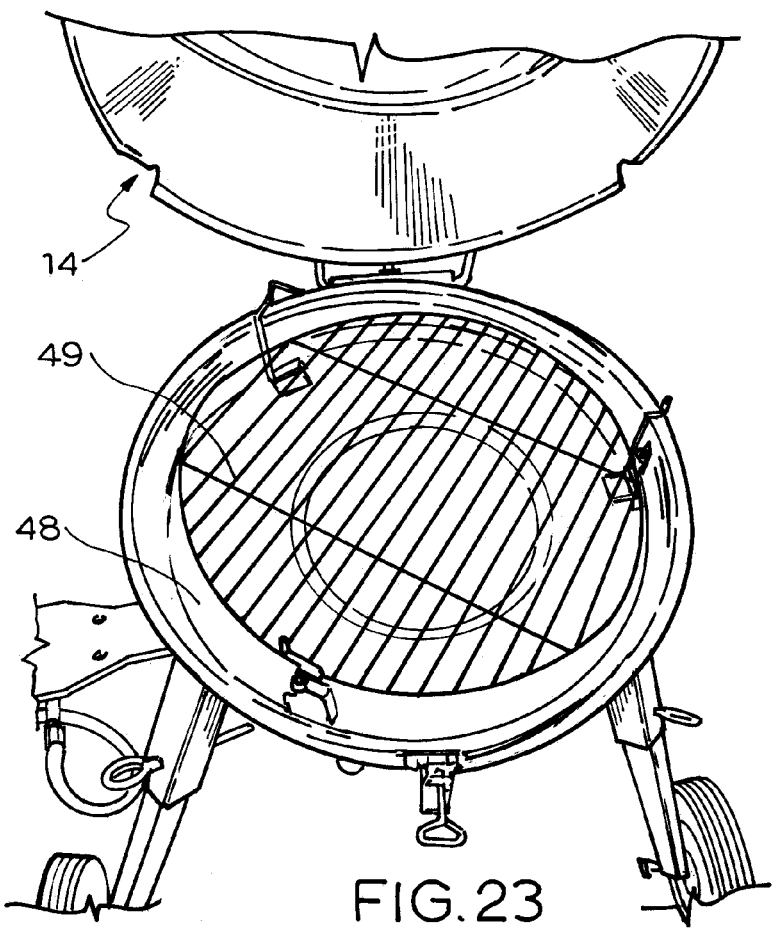
FIG. 23 is an isometric view of the barbecue illustrated in FIG. 1 in a smoker configuration.

In FIG. 23, the barbecue is configured as a smoker unit. A support tray 48 is located in the lower portion 16 with a smoking mesh tray 49 above it. Smoking timbers or coals are placed on the support tray 48 and the smoke treats the food on the mesh tray 49 above. The kettle portion 14 is closed when smoking.

Figure 28:
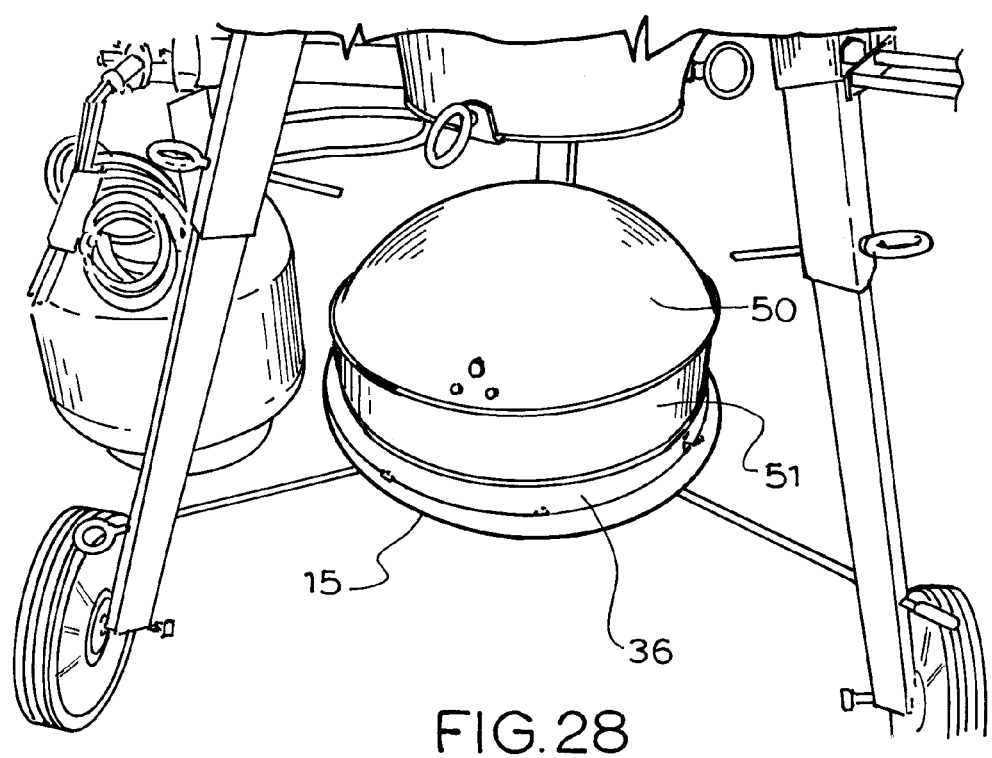
FIG. 28 is an axonometric view of a lower portion of the combination barbecue according to a preferred embodiment with a container and cover.
Figure 29:
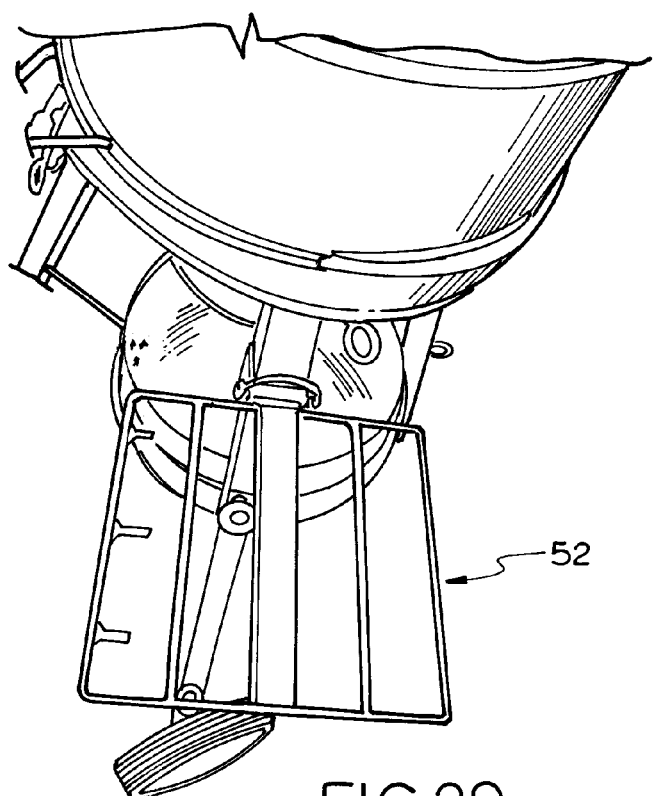
FIG. 29 is an alternate axonometric view to that illustrated in FIG. 28 with a support wing attached to a leg of the barbecue.
Figure 30:
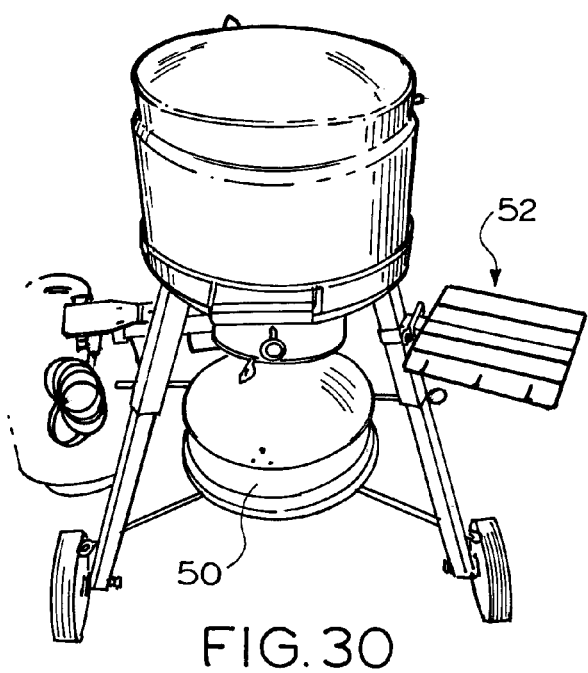
FIG. 30 is an axonometric view of the accommodation barbecue according to a preferred embodiment of the present invention.

The combination barbecue of the present invention may further include a container 50 with cover 51 locatable in or on the drip tray 15 for temporary storage, one form of which is illustrated in FIGS. 28 to 30. It is preferred that the container 50 with cover 51 is capable of insertion into the lower portion 13 of the combination barbecue as required. The container 50 of the illustrated embodiment is circular having a base wall and a cylindrical sidewall upstanding from the base wall. According to a preferred embodiment, the cover 51 is partially spherical. It is preferred that the container 50 be sized such that the container 50 can be received within the upstanding wall 36 on the drip tray 16 in order to allow movement of the barbecue without dislodging the container 50.

It is further preferred that one or more support wings 52 may be provided, particularly in relation to one or more of the legs of the combination barbecue upon which devices used with the barbecue can be located during use. In particular, it is preferred that a support wing 52 be provided that attaches and detaches easily and quickly to an upper portion of one of the legs of the combination barbecue. This will allow items such as a plate or tray containing food to be rested on the support wing whilst using the barbecue to cook the food.

Figure 31:
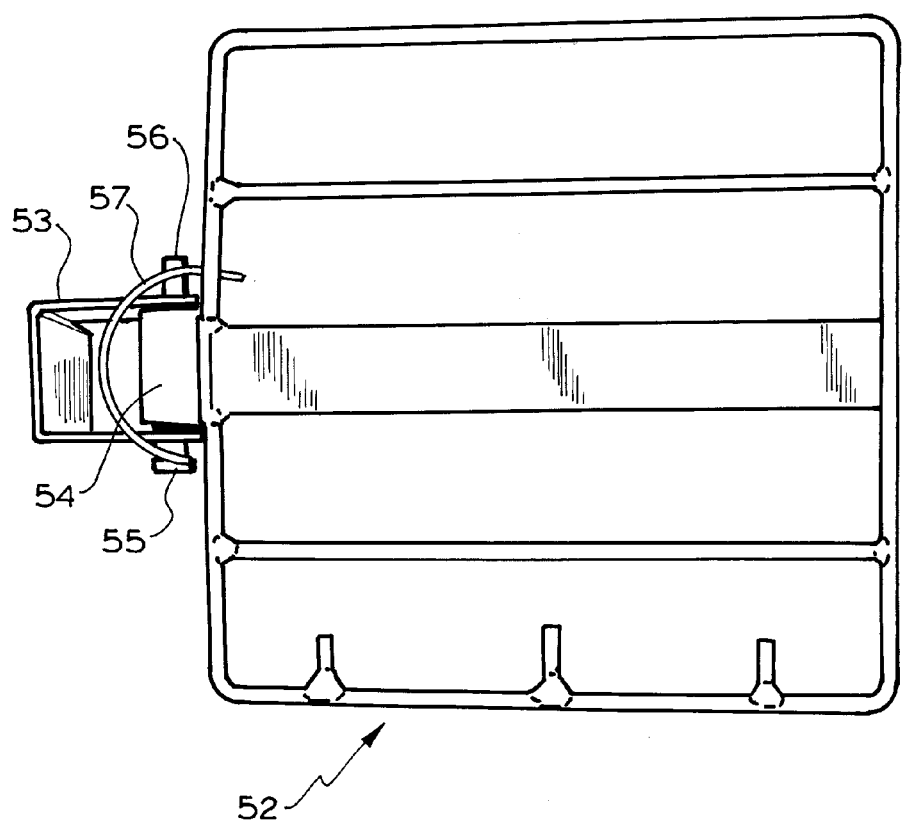
FIG. 31 is a plan view of a support wings according to a preferred embodiment of the present invention.

The attachment mechanism illustrated in the preferred embodiment illustrated in FIG. 31 is an L-shaped bracket 53 that is mounted to the support wing 52 at a mounting tube 54. An opening in the bracket 53 is aligned with the tube 54 and a pin 55 inserted through the aligned openings. A locking member 57 can then be located over the protruding free end 56 of the pin 55 to prevent accidental dislodgement. The wing 52 will normally be separated from the bracket 53 during the mounting process and attached the components attached to one another, once the bracket 53 is located partially about a leg of the barbecue.

The portions the combination barbecue of the present invention are attached to one another in any way using any mechanism. This will typically allow the combination barbecue to be collapsed as much as possible of the portions to be detached from one another to change the configuration of the combination barbecue for different uses.

In the present specification and claims, the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations. Certain features which are, for clarity, described in the context of separate embodiments, may also be provided in combination in a single embodiment. Conversely, various features which are, for brevity, described in the context of a single embodiment, may also be provided in multiple embodiments separately or in any suitable subcombination in view of the description and figures. Moreover, although features may be described above as acting in certain combinations and even initially claimed as such, one or more features from a claimed combination can in some cases, in view of the description and figures, be excised from the combination, and the claimed combination may be directed to a subcombination or variation of a subcombination.

The invention has been described in language more or less specific to structural or methodical features. It is to be understood that the invention is not limited to specific features shown or described since the means herein described comprises preferred forms of putting the invention into effect. Moreover, use of words and phrases, such as "the present invention", "preferred", "a preferred embodiment", "will preferably", "normally", "typically", and "particularly", are included by way of example only, and not limitation. Thus, the principles, elements and features described may be employed in varied and numerous implementations, and various modifications may be made to the described embodiments without departing from the spirit and scope of the invention. Accordingly, other embodiments are within the scope of the following claims, as the invention is claimed in any of its forms or modifications within the proper scope of the appended claims appropriately interpreted by those skilled in the art.

The invention claimed is:

1. A combination barbecue comprising:
a divergent stepped lower portion;
at least one heating device removably locatable within the divergent stepped lower portion; and
a kettle portion locatable above the lower portion to form the combination barbecue;
wherein the kettle portion comprises (i) an open end, (ii) a closed end, (iii) a first portion adjacent the open end and having a first dimension corresponding to an upper part of the divergent stepped lower portion such that the kettle portion forms a lid for the combination barbecue in a first configuration with the closed end uppermost above the divergent stepped lower portion, and (iv) a second portion adjacent the closed end and having a second dimension that is smaller than the first dimension and being sized to be received into the upper part of the divergent stepped lower portion such that the kettle portion forms a large pot for the combination barbecue in a second configuration with the open end uppermost above the divergent stepped lower portion.

2. A combination barbecue as claimed in claim 1, wherein the divergent stepped lower portion has a lower divergent section and an upper divergent section with the lower divergent section being smaller in dimension than the upper divergent section.

3. A combination barbecue as claimed in claim 1, wherein at least one upper land portion is located at or towards an upper end of the divergent stepped lower portion.

4. A combination barbecue as claimed in claim 1, wherein the divergent stepped lower portion has an open bottom defined by at least one edge and a portion of the at least one edge is removed to form a scallop opening in the edge.

5. A combination barbecue as claimed in claim 4, wherein the scallop opening allows the at least one heating device to be inserted into position within the lower opening and have a portion of the heating device extending laterally through the scallop opening.

6. A combination barbecue as claimed in claim 1, wherein the at least one heating device includes a primary gas burner.

7. A combination barbecue as claimed in claim 6, wherein the at least one heating device includes one or more secondary heating devices including a heat exchange coil through which water can flow in order to heat the water in the heat exchange coil, the heat exchange coil located above the primary gas burner.

8. A combination barbecue as claimed in claim 1, further including a lower drip tray, which corresponds with the divergent stepped lower portion and the kettle portion and is radially larger than an upper end of the divergent stepped lower portion and the open end of the kettle portion to allow the drip tray to be converted for use as a lid.

9. A combination barbecue as claimed in claim 1, comprising a support ring locatable within the lower portion of the combination barbecue above the at least one heating device against a wall of the divergent stepped lower portion.

10. A combination barbecue as claimed in claim 1, further comprising:
at least one open grill plate;
at least one barbecue plate; and
an open support frame insertable into the divergent stepped lower portion to support a pizza stone thereon.

11. A combination barbecue as claimed in claim 1, wherein the kettle portion comprises a circumferential step between the first and second dimensions of the first and second portions of the kettle portion.

12. A combination barbecue as claimed in claim 11, wherein the second dimension of the second portion is spaced concentrically inwardly from the first dimension of the first portion of the kettle portion.

13. A combination barbecue as claimed in claim 1, further comprising one or more support wings that readily attach and detach to the combination barbecue.

14. A combination barbecue as claimed in claim 1, mounted on a leg assembly to space the combination barbecue above the ground surface.

* * * * *